United States Patent
Kobayashi et al.

(10) Patent No.: US 7,480,450 B2
(45) Date of Patent: Jan. 20, 2009

(54) CAMERA SYSTEM AND CAMERAS CONNECTABLE TO RADIO NETWORK, WHICH ARE USED IN THE CAMERA SYSTEM

(75) Inventors: Masao Kobayashi, Nagano (JP); Shuji Asami, Shizuoka (JP); Kunihiko Kanai, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 581 days.

(21) Appl. No.: 11/296,946

(22) Filed: Dec. 8, 2005

(65) Prior Publication Data

US 2006/0182431 A1 Aug. 17, 2006

(30) Foreign Application Priority Data

Feb. 17, 2005 (JP) ............................. 2005-040181

(51) Int. Cl.
*G03B 17/00* (2006.01)
*H04N 5/232* (2006.01)

(52) U.S. Cl. .................................... 396/56; 348/211.3

(58) Field of Classification Search .................. 396/56, 396/180, 182, 322, 325, 333; 348/211.3, 348/371
See application file for complete search history.

(56) References Cited

U.S. PATENT DOCUMENTS 7,046,292 B2 * 5/2006 Ziemkowski ................ 348/371

2004/0150724 A1 8/2004 Nozaki et al.

FOREIGN PATENT DOCUMENTS

| JP | 2004-048648 | 2/2004 |
| JP | 2004-235786 | 8/2004 |

* cited by examiner

*Primary Examiner*—Rodney E Fuller
(74) *Attorney, Agent, or Firm*—Pamela R. Crocker

(57) ABSTRACT

Coordinated image capturing is appropriately performed even if an error occurs in the synchronization between cameras that are connected via a network. Camera A for image capturing and camera B for providing strobe light are connected via a radio network, and camera A sets a point at which to start exposure for image capturing Tx and a point at which to start strobe emission Tf such that Tx is earlier than Tf, the time difference Id between Tx and Tf becomes larger than a synchronization error Ie between a synchronous clock of camera A and a synchronous clock of camera B, and the sum (Id+If+Ie) of the time difference Id, the strobe emission period If and the synchronization error Ie becomes smaller than exposure period Ix. Then, camera A outputs a strobe emission command with Tf designated and an exposure command with Tx designated, and controls the exposure control mechanism to start exposure at Tx in response to the exposure command. On the other hand, camera B controls the strobe mechanism to start strobe emission at Tf in response to the strobe emission command received via the radio network.

15 Claims, 16 Drawing Sheets

CAMERA SYSTEM AND CAMERAS CONNECTABLE TO RADIO NETWORK, WHICH ARE USED IN THE CAMERA SYSTEM

FIELD OF THE INVENTION

The present invention relates to a camera system where a plurality of cameras are connected to each other via a radio network and coordinated image capturing is performed.

BACKGROUND OF THE INVENTION

In recent years, a system performing communication among a plurality of cameras by endowing the cameras with a communication function has been suggested.

Japanese Patent Laid-open No. 2004-048648 publication (paragraph no. 0046), describes the point where a plurality of cameras with built-in strobe, which have a communication function, are connected to each other via a network, and when a specific camera is engaged in a strobe image capturing mode, the other cameras that have been previously associated with the camera are also engaged in strobe image capturing mode to perform strobe image capturing or only strobe emission.

Further, Japanese Patent Laid-open No. 2004-235786 publication suggests digital cameras having setting means for setting the cameras to only emit strobe depending on a subject, or setting each camera to emit strobe at reduced emission output when a plurality of digital cameras are connected to each other to perform coordinated image capturing using strobe.

As described above, when performing coordinated image capturing using strobe by connecting a plurality of cameras to each other via a network, there are cases where coordinated image capturing using strobe cannot be performed appropriately if the cameras are not synchronized with each other. However, there are cases where an error occurs in synchronization among cameras when the cameras are synchronously connected via a network.

SUMMARY OF THE INVENTION

It is an advantage of the present invention to appropriately perform coordinated image capturing using strobe even if an error occurs in synchronization among cameras that are synchronously connected to each other via a network.

A camera system according to the present invention is a camera system where a camera for image capturing with built-in exposure control mechanism and a camera for providing strobe light with built-in strobe mechanism are synchronously connected via a radio network, in which the camera for image capturing has: determining means for determining a point at which to start exposure for image capturing Tx and a point at which to start strobe emission Tf; emission start command output means for outputting a strobe emission start command to start strobe emission at the point at which to start strobe emission Tf; exposure start command output means for outputting an exposure start command to start exposure at the point at which to start exposure for image capturing Tx; and exposure control means for controlling the exposure control mechanism so as to start exposure at the point at which to start exposure for image capturing Tx in response to the exposure start command, the camera for providing strobe light has emission control means for controlling the strobe mechanism so as to start strobe emission at the point at which to start strobe emission Tf in response to the strobe emission start command that has been received via the radio network, and the determining means determines the point at which to start exposure for image capturing Tx and the point at which to start strobe emission Tf such that the point at which to start exposure for image capturing Tx is earlier than the point at which to start strobe emission Tf, a time difference between the point at which to start exposure for image capturing Tx and the point at which to start strobe emission Tf becomes larger than the synchronization error between the camera for image capturing and the camera for providing strobe light, and strobe emission ends before completing exposure.

According to the present invention, the determining means of the camera for image capturing determines the point at which to start exposure for image capturing Tx and the point at which to start strobe emission Tf such that the point at which to start exposure for image capturing Tx is earlier than the point at which to start strobe emission Tf, the time difference between the point at which to start exposure for image capturing Tx and the point at which to start strobe emission Tf becomes larger than the synchronization error between the camera for image capturing and the camera for providing strobe light, and strobe emission ends before completing exposure. Consequently, it is possible to start strobe emission of the camera for providing strobe light and appropriately complete image capturing within the exposure period of the camera for image capturing even if a synchronization error of a previously assumed range occurs between the camera for image capturing and the camera for providing strobe light.

According to another aspect of the camera system according to the present invention, the invention is a camera system where a plurality of cameras with built-in exposure control mechanism and strobe mechanism are synchronously connected via the radio network, one of the plurality of cameras becomes a host camera and the other cameras become sub-cameras, and the plurality of cameras perform simultaneous image capturing when the host camera controls each sub-camera, in which each camera has: means for determining the point at which to start exposure for image capturing Tx and the point at which to start strobe emission Tf, which is determining means for determining the point at which to start exposure for image capturing Tx and the point at which to start strobe emission Tf such that the point at which to start exposure for image capturing Tx is earlier than the point at which to start strobe emission Tf, the time difference between the point at which to start exposure for image capturing Tx and the point at which to start strobe emission Tf becomes larger than the synchronization error that occurs between the cameras, and strobe emission ends before completing exposure; emission start command output means for outputting a strobe emission start command to start strobe emission at the point at which to start strobe emission Tf; exposure start command output means for outputting an exposure start command to start exposure at the point at which to start exposure for image capturing Tx; exposure control means for controlling the exposure control mechanism so as to start exposure at the point at which to start exposure for image capturing Tx in response to the exposure start command; and emission control means for controlling the strobe mechanism so as to start strobe emission at the point at which to start strobe emission Tf in response to the strobe emission start command, wherein each camera, when it becomes the host camera, determines the point at which to start exposure for image capturing Tx and the point at which to start strobe emission Tf by the determining means, outputs the exposure start command to each sub-camera by the exposure command output means, controls the exposure control mechanism so as to start exposure at the point at which to start exposure for image capturing Tx by the exposure control means, and controls the strobe mechanism so as to start strobe emission at the point at which to start strobe emission Tf by the emission control means, and each camera, when it becomes the sub-camera, controls the exposure control mechanism so as to start exposure at the point at which to start exposure for image capturing Tx by the exposure control means in response to the exposure start command received from the host camera via the radio network.

According to the present invention, the determining means of the camera being a host determines the point at which to start exposure for image capturing Tx and the point at which to start strobe emission Tf such that the point at which to start exposure for image capturing Tx is earlier than the point at which to start strobe emission Tf, the time difference between the point at which to start exposure for image capturing Tx and the point at which to start strobe emission Tf becomes larger than the synchronization error between the camera for image capturing and the camera for providing strobe light, and strobe emission ends before completing exposure. Consequently, it is possible to start strobe emission within the exposure period of each camera to complete image capturing even if the synchronization error occurs between cameras, and simultaneous image capturing using strobe by a plurality of cameras can be appropriately performed.

According one aspect of the camera system of the present invention, an order to become the host camera is previously fixed for each camera, and a camera to be the host camera is switched according to the order for each simultaneous image capturing.

According to the present invention, continuous image capturing can be performed while the camera performing strobe emission is sequentially switched, so that the number of images that can be captured within a predetermined time can be increased without being limited by charging time for strobe emission, compared a case where one camera performs continuous image capturing while performing strobe emission.

According one aspect of the camera system of the present invention, each camera has order registration means for capturing a different image for a previously designated camera, determining an order to become the host camera based on image data obtained from an image capturing result, and registering the order with itself.

According to the present invention, each camera recognizes its own order to become the host camera based on image data that is obtained by capturing an image that shows a figure or the like denoting the order. Thus, it is possible to easily fix the order of each camera by utilizing the intrinsic image capturing function of camera.

DETAILED DESCRIPTION OF THE INVENTION

The first embodiment of the present invention will be described as follows using the accompanied drawings.

Figure 1:
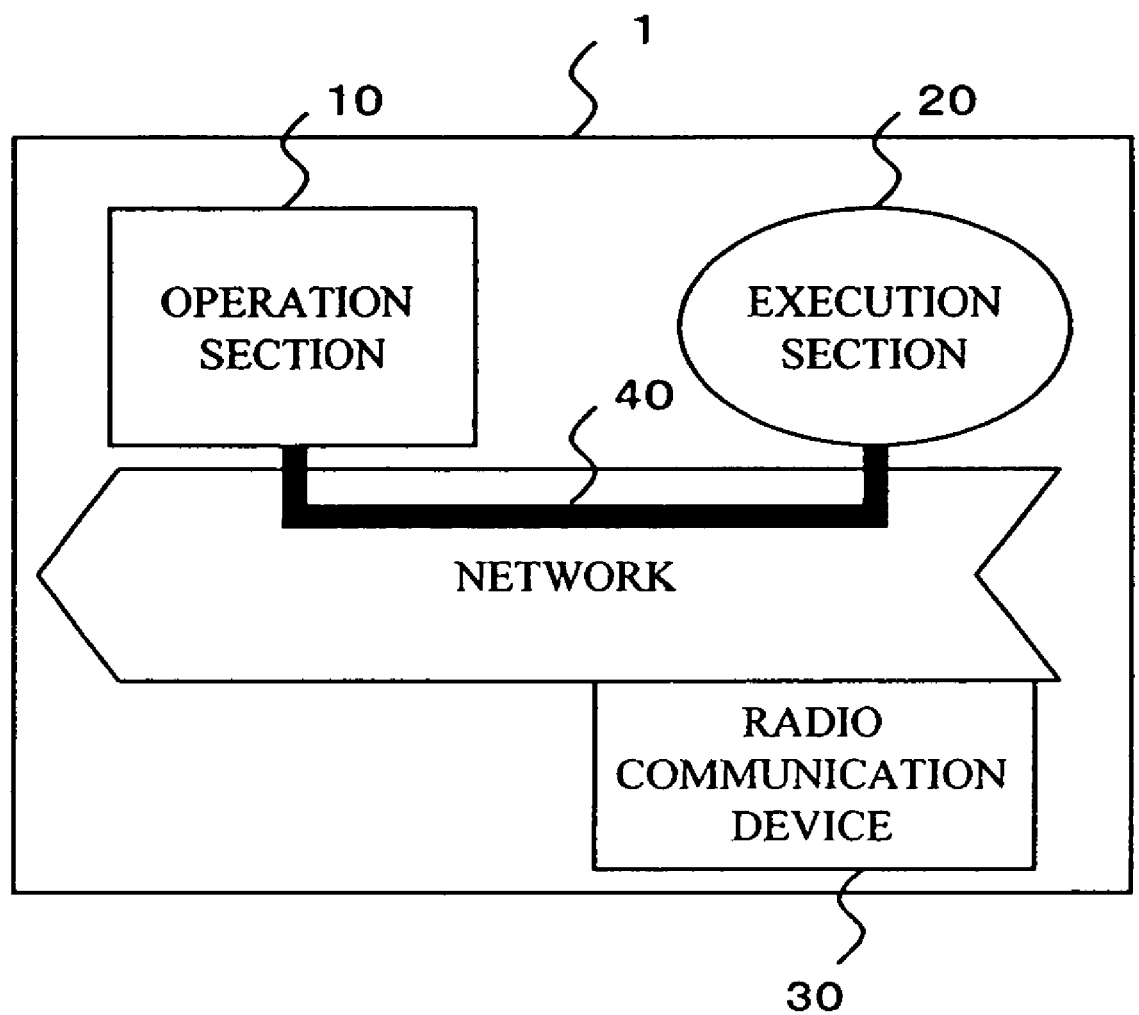
FIG. 1 is a functional block diagram of each camera in the first and the second embodiments.

FIG. 1 is the view showing the functional blocks of a digital camera 1 in this embodiment. The digital camera 1 is constituted by including an operation section 10, an execution section 20 and a radio communication device 30 as three principal components.

The operation section 10 is a UI component that performs dialog with a user, and it controls a user interface such as operation buttons that the user uses in operating the digital camera 1. The execution section 20 is a component that integrates functions of digital camera 1 such as image capturing and image data storage. The operation section 10 and the execution section 20 communicate with each other by using a general-purpose communication protocol via interface circuits (103, 203) shown below.

In this embodiment, PTP (Picture Transfer Protocol) is used as implementation protocol of the interface circuits (103, 203) and TCP/IP is used as a communication protocol forming the basis of the interface. Then, the operation section 10 and the execution section 20 communicate with each other by exchanging a PTP command and its response via socket stream, being a communication path 40.

Further, the digital camera 1 has the radio communication device 30 to communicate with other digital cameras or the like via a network. The digital camera 1 performs radio communication with other digital cameras via the radio communication device 30 based on a communication method conforming to communication standard 802.11 (WiFi).

Figure 2:
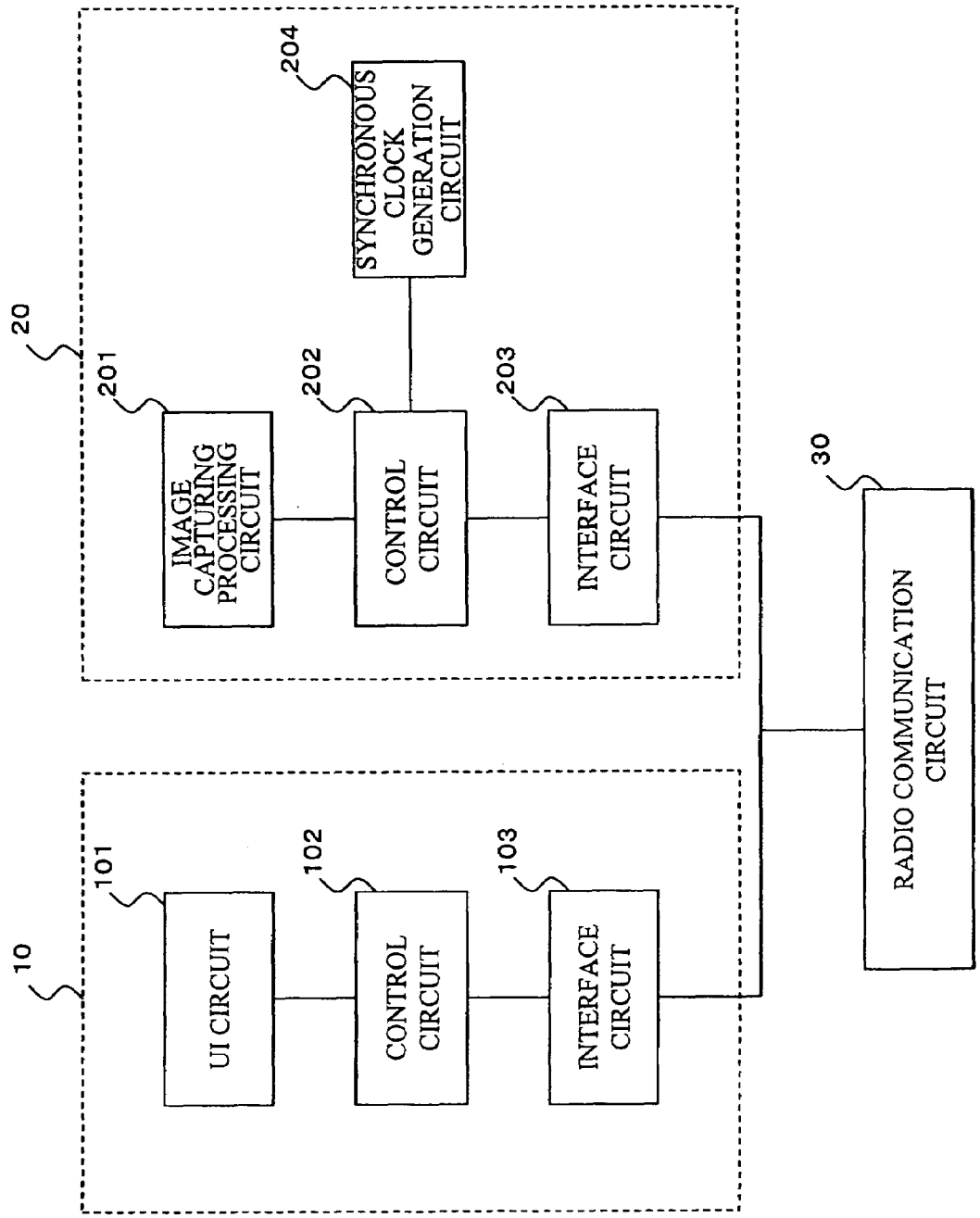
FIG. 2 is a functional block diagram showing an operation section and an execution section, which constitute each camera in the first and the second embodiments, in more detail.

FIG. 2 is a more detailed functional block diagram of the operation section 10 and the execution section 20. The operation section 10 includes operation buttons such as a shutter button and various kinds of mode switching buttons, a UI circuit 101 including a display for displaying images, or the like, a control circuit 102 that controls the entire operation section 10, and an interface circuit 103, being a communication interface used when performing communication with the execution section 20 and communication with other digital cameras or the like via a radio communication device.

The execution section 20 includes an image capture processing circuit 201 that performs image capture processing, a control circuit 202 that controls the entire execution section 20, an interface circuit 203 being a communication interface when performing communication with the operation section 10 and communication with other digital cameras or the like via the radio communication device, and a synchronous clock generation circuit 204 that generates a synchronous clock when the control circuit 202 controls the image capture processing circuit 201.

Figure 3:
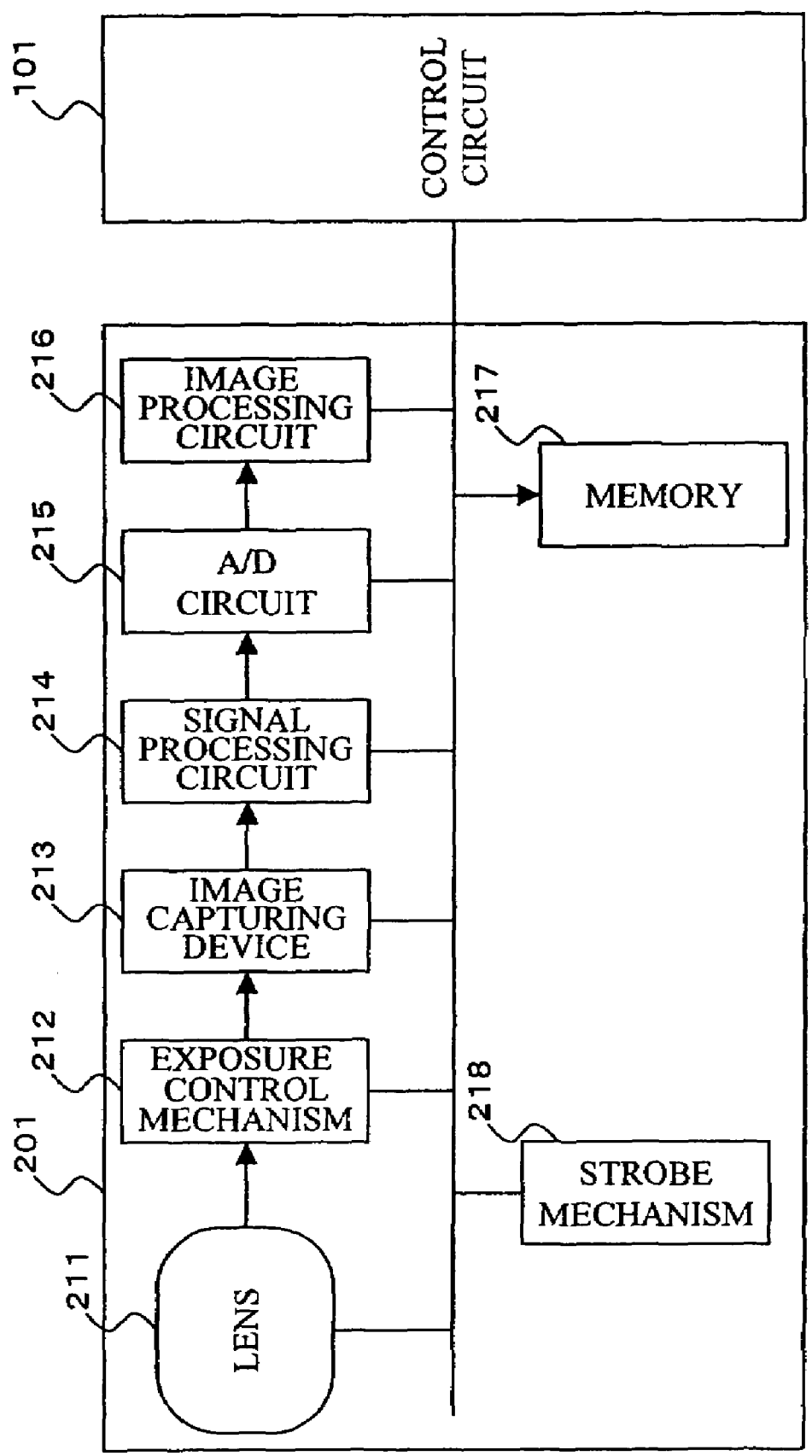
FIG. 3 is a functional block diagram showing the image capture processing circuit of the execution section that constitutes each camera in the first and the second embodiments, in more detail.

Further, FIG. 3 is a functional block diagram showing the image capture processing circuit 201 included in the execution section 20 in more detail. In FIG. 3, a light amount having passed a lens 211 is controlled by an exposure control mechanism 212, and a subject image is formed on an image capturing screen of an image capturing device 213. The image capturing device 213 outputs the formed subject image using a predetermined clock to a signal processing circuit 214 as an image capturing signal. The signal processing circuit 214 performs signal processing such as luminance signal processing and color separation on the image capturing signal that has been input. An A/D circuit 215 converts the image capturing signal after signal processing from an analog signal into a digital signal. An image processing circuit 216 applies various kinds of image processing such as gamma correction to the signal having passed A/D conversion, and the signal is saved in a memory 217 as image data. Further, strobe light is illuminated on the subject in strobe mechanism 218 if necessary.

In the digital camera constituted in this manner, the control circuit 102 receives an operation instruction from the user via the UI circuit 101, and the control circuit 102 outputs a control signal corresponding to the operation instruction to the execution section 20 via the interface circuit 103. The control circuit 202 receives the control signal from the operation section 10 via the interface circuit 203, controls the image processing circuit 201 based on the control signal, and performs image capture processing.

In this embodiment, two digital cameras constituted as described above (which are defined as camera A and camera B) are prepared. Then, a communication path is established between an operation section 10A of camera A and an execution section 20B of camera B, and radio communication is performed between camera A and camera B. At this point, camera A is caused to function as an image capturing camera and camera B is caused to function as an external strobe under the control of camera A. Thus, image capturing using an external strobe is executed without preparing a special device.

Herein, description will be given for a processing flow when camera A is caused to function as an image capturing camera and camera B is caused to function as an external strobe with reference to the view shown in FIG. 4. Note that camera A and camera B are installed in positions shown in FIG. 5. Specifically, camera A is arranged in a desired image capturing position for a subject 2, and camera B is arranged in a position from which desired strobe light can be illuminated on the subject 2.

Figure 4:
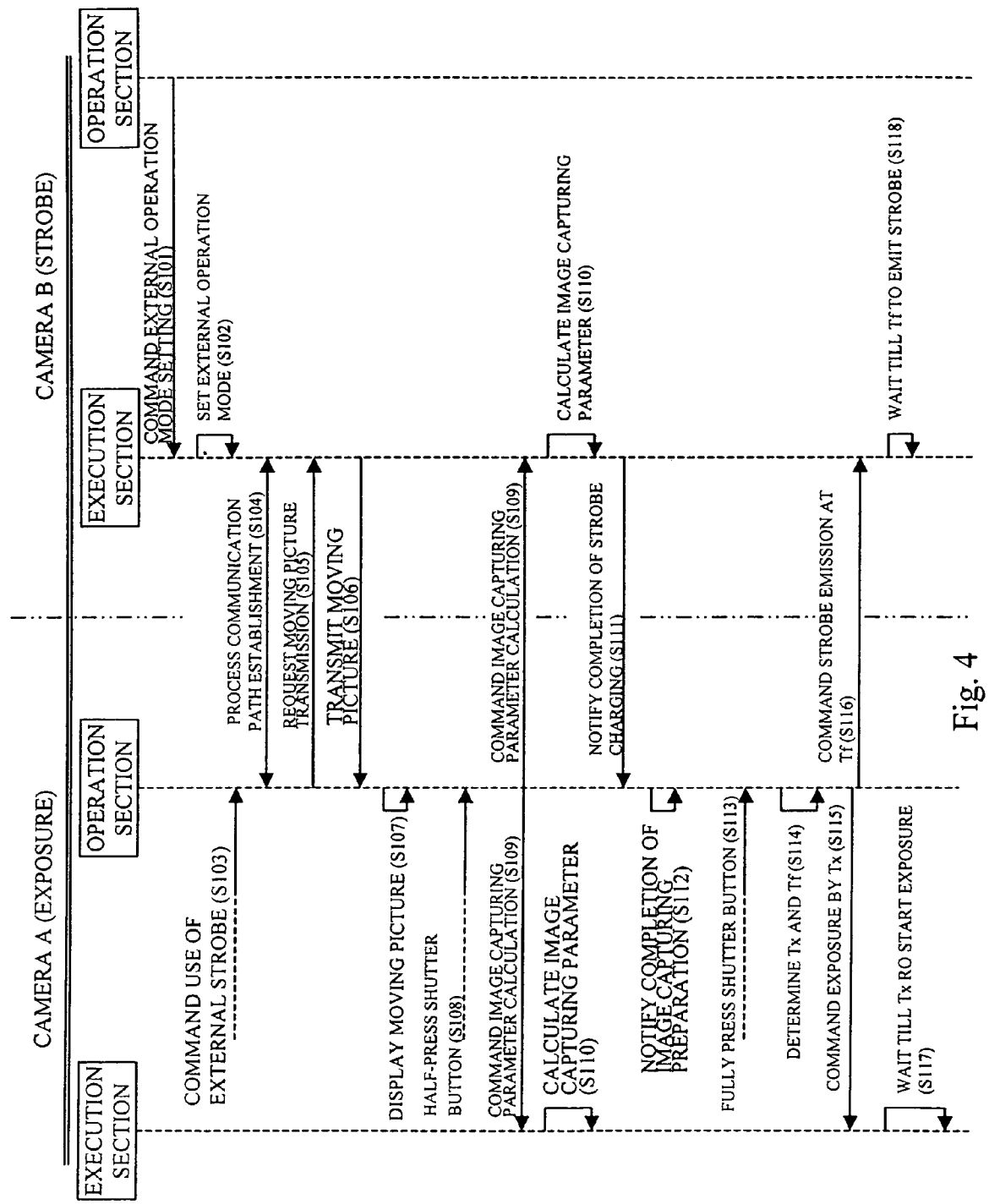
FIG. 4 is a view showing the processing procedure exchanged between camera A and camera B in the first embodiment.
Figure 5:
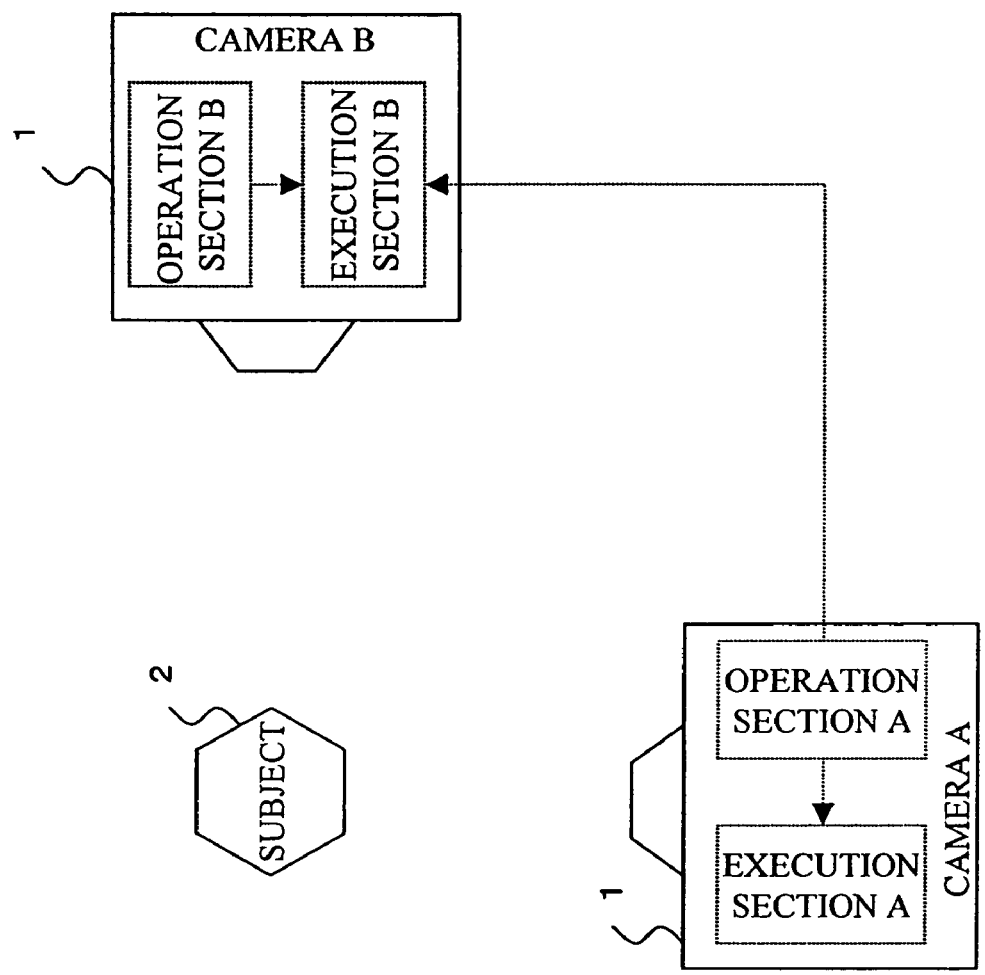
FIG. 5 is an image diagram showing an arrangement relationship between camera A, camera B and a subject in the first embodiment.

In FIG. 4, an operation section 10B outputs an external operation mode setting command to the execution section 20B first (S101) in order to set an operational mode of camera B, being an operated camera, to an external operation mode. Receiving the external operation mode setting command, the execution section 20B switches the mode from a regular image capturing mode to the external operation mode (S102). When the execution section 20B is set to the external operation mode, it enters a stand-by state until a connection request is sent from camera A, being an operating camera.

On the other hand, on receiving an external strobe use command from the user (S103), the operation section 10A of camera A performs establishment processing of a communication path to the execution section 20B (S104). Note that an establishing method of the communication path between the operation section 10A and the execution section 20B will be described later.

Next, the operation section 10A requests the execution section 20B to transmit moving images via the communication path established in S104 (S105), and the execution section 20B, on receiving the request, transmits the moving images of the subject 2, which are obtained in the execution section 20B, to the operation section 10A (S106). The operation section 10A displays the obtained moving images on the display of camera A (S107). Thus, the user can see the subject 2 on the display of camera A from the viewpoint of camera B, and can correct the position and the pose of the subject 2.

Subsequently, when the operation section 10A detects that the user has half-pressed the shutter button (S108), it outputs an image capturing parameter calculation command to the execution section 20A and the execution section 20B (S109). On receiving the command, the execution section 20A and the execution section 20B execute image capturing parameter calculation (S110). Herein, the image capturing parameter refers to a parameter necessary in capturing the image of the subject 2, and it is calculated based on an image capturing signal output from the image capturing device 213 or a signal output from an external sensor that is separately provided for the camera. Note that exposure period or strobe emission period depending on an image capturing scene is calculated by this calculation. Based on the parameter, the control circuit 202 controls the image capture processing circuit 201 to perform AE (Auto Exposure), AF (Auto Focus), AWB (Auto White Balance) or the like. Furthermore, since camera B is used as the external strobe in this embodiment, parameter calculation is performed on the assumption that forced strobe emission is carried out regardless of the volume of exposure to the subject 2.

After that, the execution section 20B notifies completion of strobe charging to the operation section 10A at the point where the charging of the strobe is completed (S111). On receiving the notification, the operation section 10A notifies the user of the completion of image capturing preparation by turning an LED or the like on, for example (S112). Note that this completion notification is performed immediately if strobe charge is at a fully charged state.

Herein, when the user who has recognized the completion of image capturing preparation fully presses the shutter button (S113), the operation section 10A, on receiving the action, determines Tx showing a time to start exposure in camera A and Tf showing time to start strobe emission in camera B (S114), outputs a command to the execution section 20A so as to start exposure at the determined Tx (S115), and outputs a command to the execution section 20B so as to start strobe emission at the determined Tx (S116). At this point, Tx is calculated taking time required in S115 and S116 in consideration.

After that, the execution section 20A waits until the time Tx and starts exposure at the time Tx (S117). On the other hand, the execution section 20B waits until time Tf and starts strobe emission at the time Tf (S118).

Consequently, camera A can perform image capturing by the external strobe by using the strobe mechanism equipped in camera B.

However, when the camera A and camera B are synchronously connected via the radio network, camera A performs exposure, and camera B performs strobe emission as described above, there are cases where image capturing by the external strobe cannot be appropriately performed if a synchronization error occurs between camera A and camera B.

Consequently, Tx and Tf are determined in this embodiment while the synchronization error that occurs between camera A and camera B, which are connected via the radio network, is taken in consideration.

Figure 6A:
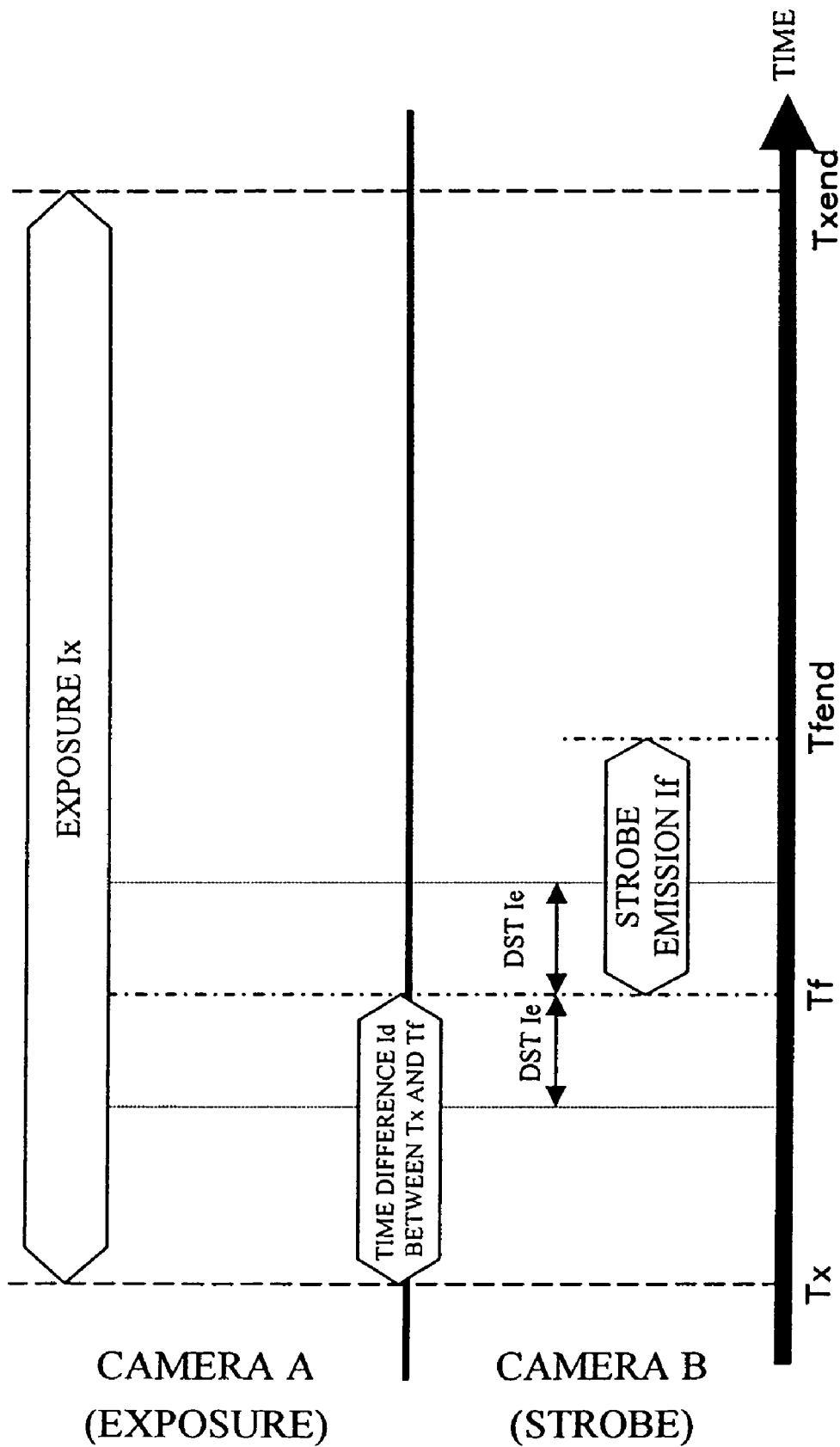
FIG. 6A is a view for explaining the relationship between a point at which to start exposure for image capturing Tx and a point at which to start strobe emission Tf in the first embodiment.
Figure 6B:
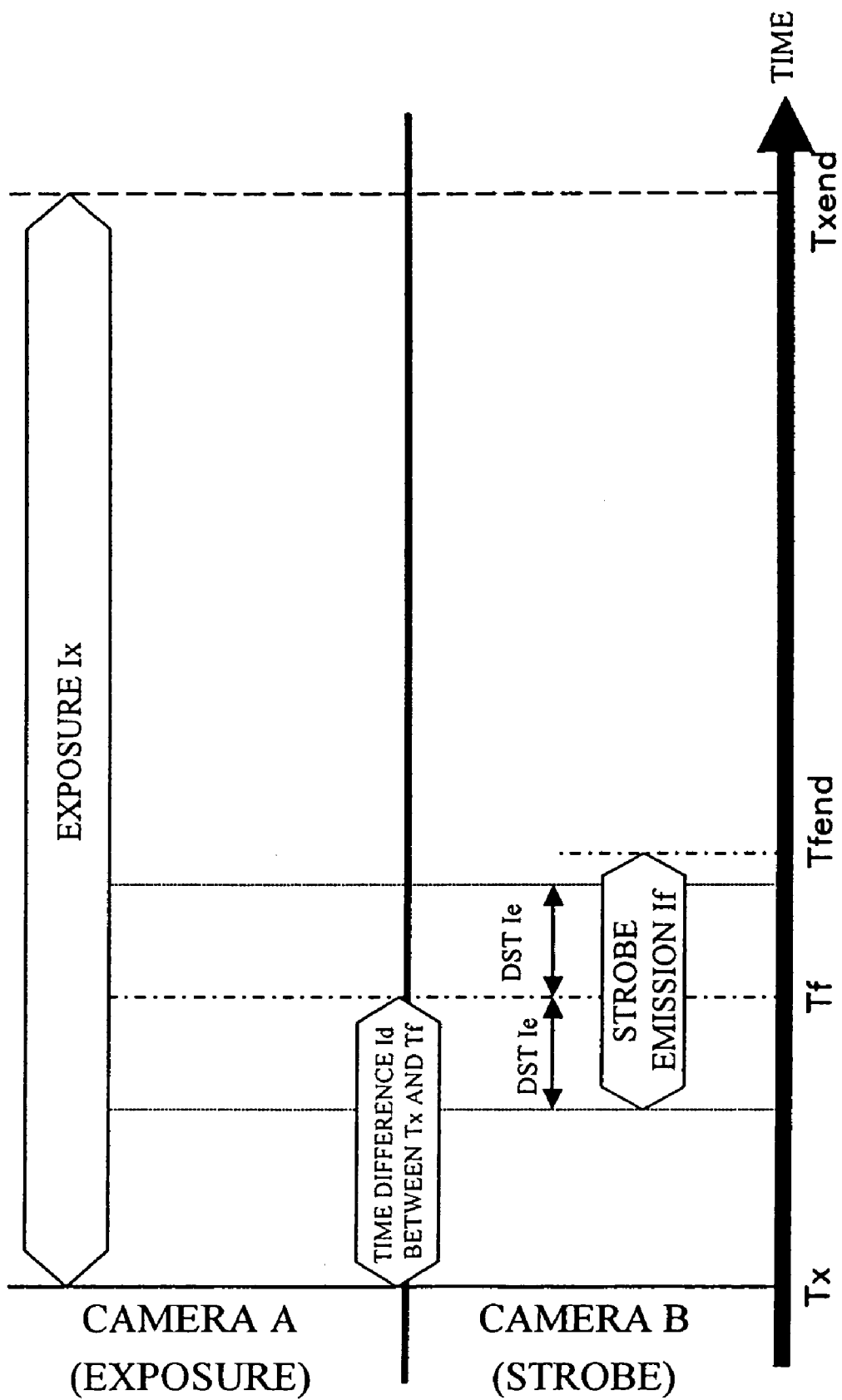
FIG. 6B is a view for explaining the relationship between the point at which to start exposure for image capturing Tx and the point at which to start strobe emission Tf in the first embodiment.

More specifically, assuming difference of the synchronization timing (DST) between camera A and camera B to be ±Ie, exposure period to be Ix, and strobe emission period to be If, Tx and Tf are set such that time from Tx to Tf, that is, the time difference Id between Tx and Tf becomes larger than Ie, and the sum (Id+If+Ie) of the time difference Id, the strobe emission period If and the synchronization error Ie become smaller than the exposure period Lx in order to complete strobe emission by the time exposure ends. In this way, it is possible to start and end strobe emission of camera B within the exposure period of camera A even if the synchronization error occurs between camera A and camera B. Description will be further given for the relationship between Tx and Tf by using FIGS. 6A to 6E As shown in FIG. 6A, camera B should start strobe emission at the time Tf when the time difference Id between Tx and Tf is larger than Ie, whereas, as shown in FIG. 6B, strobe emission of camera B can be started within the exposure period of camera A even if strobe emission is started at the time (Tf−Ie).

Figure 6C:
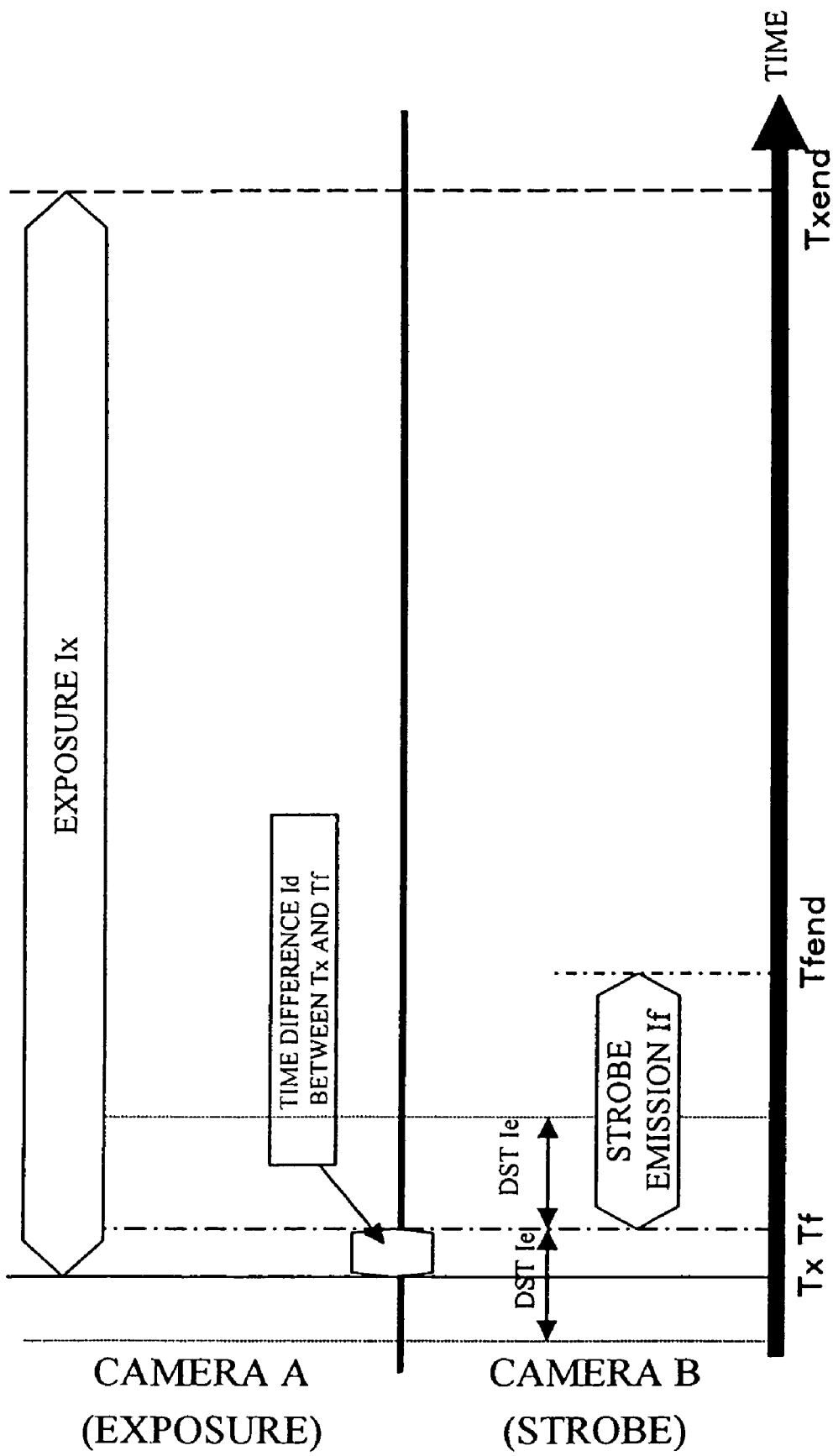
FIG. 6C is a view for explaining the relationship between the point at which to start exposure for image capturing Tx and the point at which to start strobe emission Tf in the first embodiment.
Figure 6D:
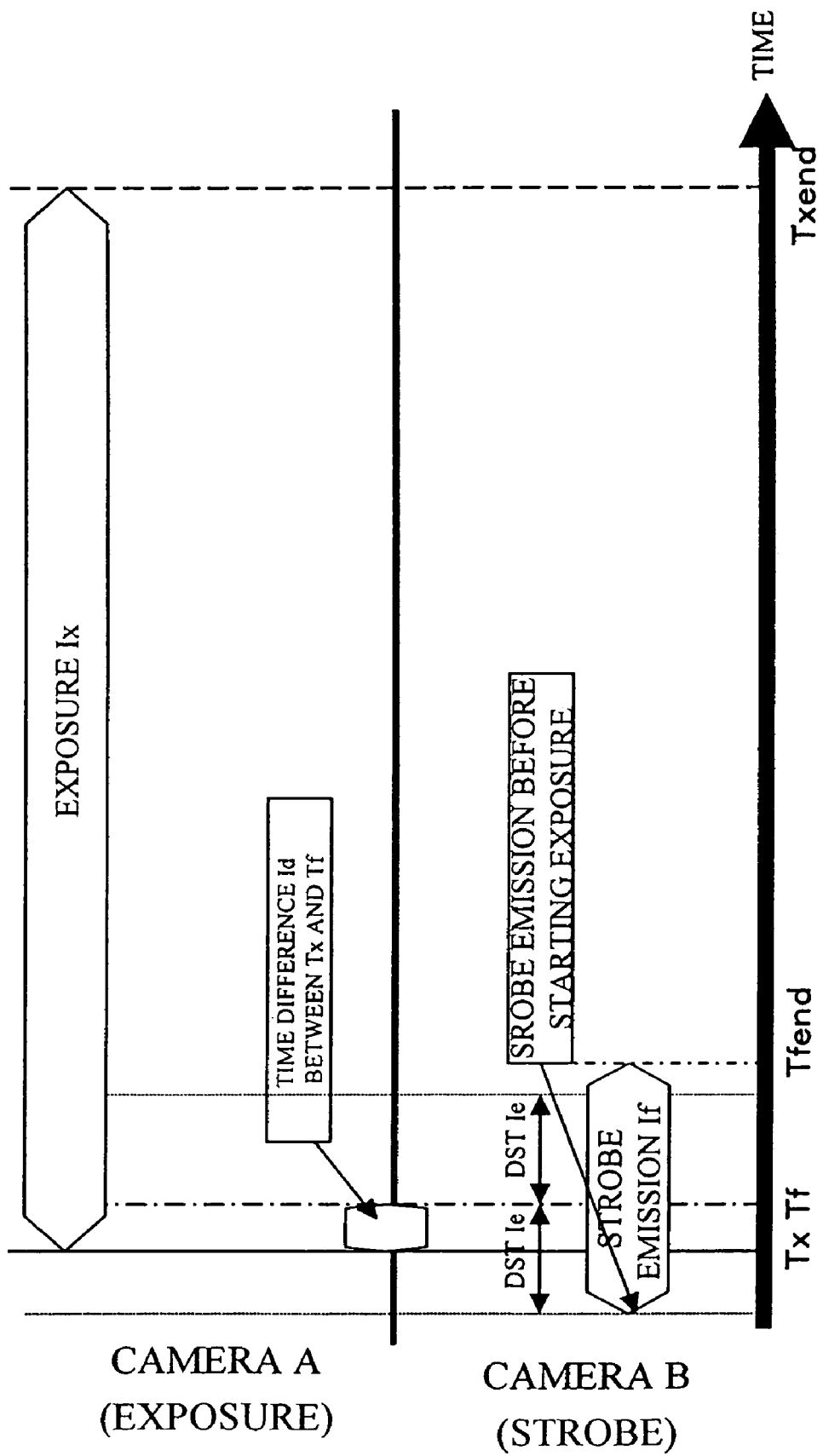
FIG. 6D is a view for explaining the relationship between the point at which to start exposure for image capturing Tx and the point at which to start strobe emission Tf in the first embodiment.

However, when the time difference Id between Tx and Tf is smaller than Ie, as shown in FIG. 6C, there are cases where strobe emission of camera B cannot be started within the exposure period of camera A when strobe emission starts at the time (Tf−Ie) as shown in FIG. 6D. Therefore, there are cases where camera A cannot perform image capturing appropriately with the external strobe using the strobe mechanism provided on camera B when the synchronization error occurs between camera A and camera B.

Figure 6E:
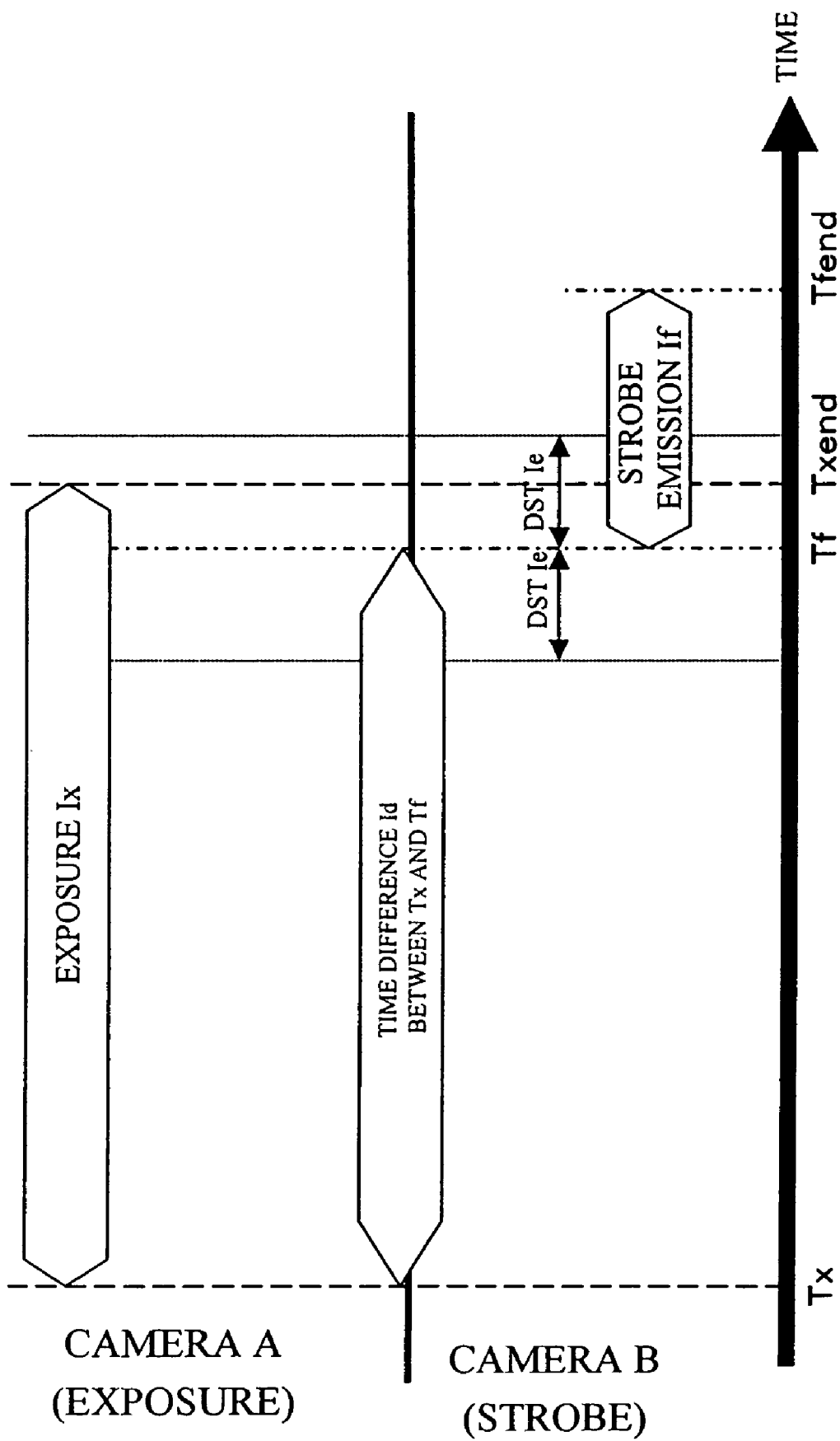
FIG. 6E is a view for explaining the relationship between the point at which to start exposure for image capturing Tx and the point at which to start strobe emission Tf in the first embodiment.

Further, as shown in FIG. 6E, there are cases where strobe emission does not end within the exposure period when the sum (Id+If+Ie) of the time difference Id, the strobe emission period If and the synchronization error Ie are larger than the exposure period Ix. Thus, there is a danger that camera A cannot perform image capturing appropriately with the external strobe using the strobe mechanism provided on camera B in this case as well.

As described above, Tx and Tf are set in this embodiment such that the time difference Id between Tx and Tf becomes larger than the synchronization error Ie that is previously assumed, and the sum (Id+If+Ie) of the time difference Id, the strobe emission period If and the synchronization error Ie become smaller than the exposure period Ix. This makes it possible to appropriately perform image capturing by synchronizing exposure using camera A with strobe emission using camera B even if the synchronization error occurs between camera A and camera B.

Generally, the exposure period Ix is 1 [ms] at the shortest and the strobe emission period If is about 20 [μs]. Further, when the communication method of communication standard 802.11 (WiFi) is used for the radio communication between camera A and camera B, the synchronization error does not exceed several 10 [μs] according to the standard. Therefore, when the time difference Id between Tx and Tf is set to 100 [μs], for example, it is possible to start and end the strobe emission of camera B within the exposure period of camera A even if the synchronization error occurs between camera A and camera B. Note that the synchronization error Ie may be fixed based on a value specified on the communication standard or specifications, or an experimental value.

Figure 7:
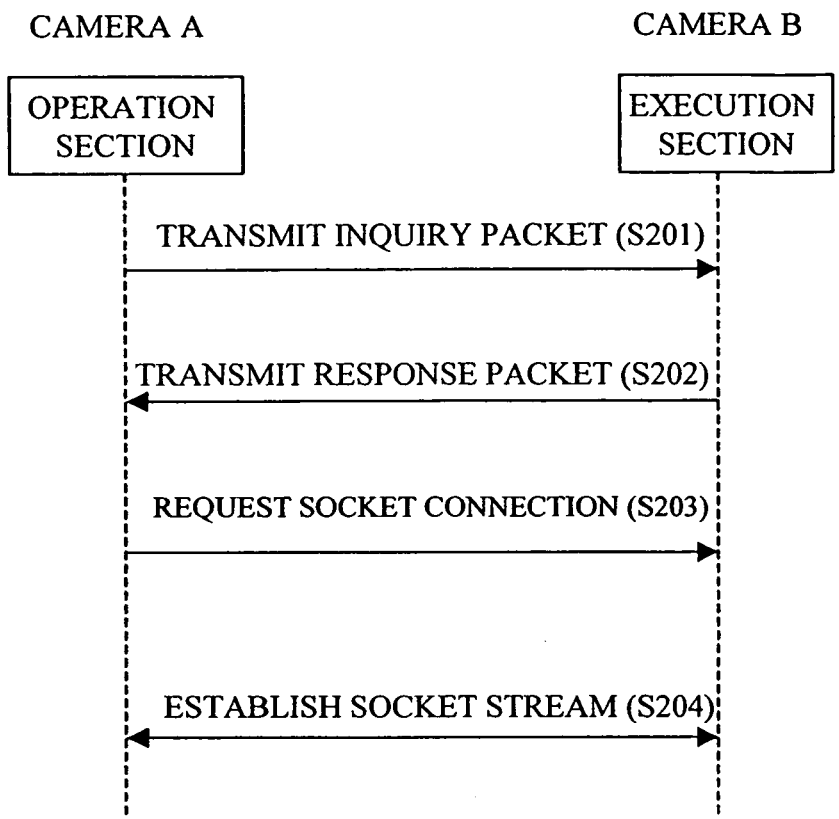
FIG. 7 is a view showing a processing procedure when a communication path is established between the operation section of camera A and the execution section of camera B in the first embodiment.

Herein, description will be given for a communication path establishment flow between the operation section 10A of camera A and the execution section 20B of camera B, which is performed in S104, using the flowchart shown in FIG. 7.

First, camera B is set to the external operation mode by operating camera B. Specifically, the execution section 20B of camera B is set to a receiving stand-by state for a connection request from another operation section, that is, inquiry packet shown below. In this state, the operation section 10A, based on the external strobe use command from the user, transmits the inquiry packet to search the execution section 20B after recognizing the radio communication device (S201). In this embodiment, a UDP packet is used for the inquiry packet, and it is multicast on a TCP network. The inquiry packet contains an IP address allocated for camera A. When the execution section 20B receives the inquiry packet, it transmits a response packet to the IP address contained in the inquiry packet on the UDP packet, and notifies the operation section 10A of the execution section's own position on the network (in short, IP address and port number allocated for camera B)(S202). The response packet contains the IP address and the port number of camera B, and when the operation section 10A receives the packet, it outputs a socket connection request to the execution section 20B to attempt socket connection with the execution section 20B (S203). Then, when the execution section 20B accepts the socket connection request, a socket stream as the communication path is established between the operation section 10A and the execution section 20B (S204). Note that synchronization between camera A and camera B is realized by one function of WiFi protocol. With the above processing, the communication path between the operation section 10A of camera A and the execution section 20B of camera B is established.

Subsequently, the second embodiment of the present invention will be described as follows using the accompanied drawings.

Figure 8:
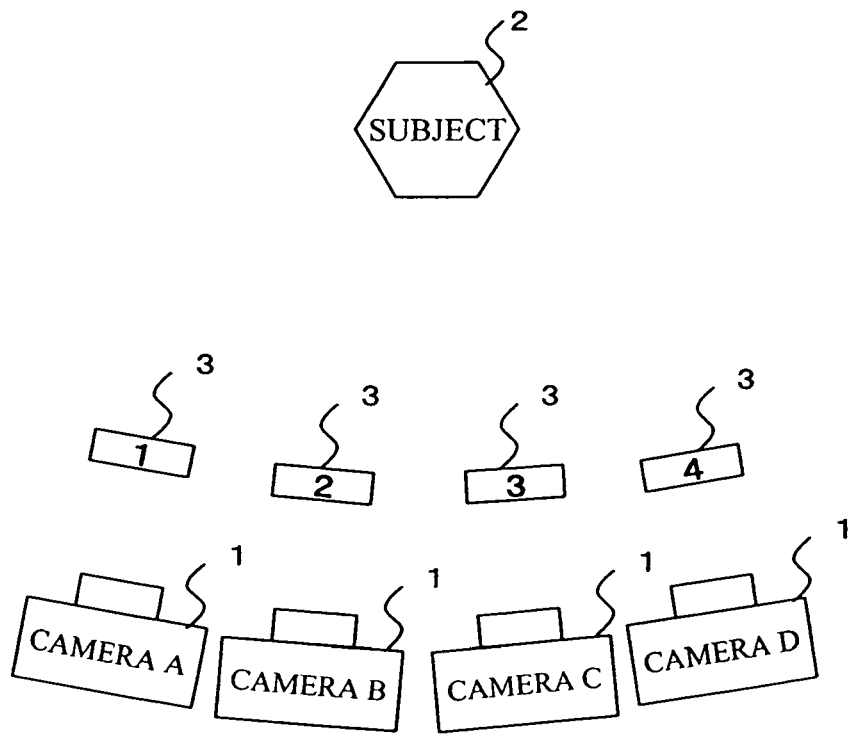
FIG. 8 is an image view showing an arrangement relationship between each camera and a subject in the second embodiment.

The constitution of each camera is the same as the first embodiment and is as shown in FIG. 1 to FIG. 3. FIG. 8 is the view showing an example of the arrangement relation between each camera and the subject 2 in this embodiment. This embodiment is on the assumption that a plurality of cameras arranged in proximity to each other are connected via the radio network and they capture the image of the subject 2 simultaneously and continuously.

When the plurality of cameras capture the image of the subject 2 simultaneously in such an arrangement of cameras, there are cases where the subject 2 becomes too bright when the cameras perform strobe emission at the same time. For this reason, only one camera is allowed to perform strobe emission in one image capturing and the other cameras capture the image of the subject 2 utilizing the strobe emission from that camera in this embodiment.

Further, in the case of performing continuous image capturing while one camera performs strobe emission, to further start image capturing associated with strobe emission after image capturing associated with strobe emission is performed, cameras need to wait until charging for strobe emission is completed. Therefore, there are cases where the number of image captures the cameras can perform within a predetermined period is limited due to the charging time. Meanwhile, in this embodiment, continuous image capturing is performed as cameras carrying out strobe emission are sequentially switched in order to increase the number of image captures that the cameras can perform within a predetermined period without being limited by the charging time.

Moreover, in the case where the plurality of cameras are connected via the radio network and simultaneous image capturing by using strobe emission is performed, it is impossible to appropriately perform simultaneous image capturing by using strobe emission if the cameras are not synchronized with each other. However, an error may occur in synchronization taken among the cameras. In this embodiment, therefore, simultaneous image capturing using strobe with the plurality of cameras is performed while the synchronization error taken among the cameras is considered.

Herein, regarding this embodiment, descriptions will given for (1) preparatory processing before simultaneous image capturing and (2) processing of the operation section of a camera performing strobe emission at the time of simultaneous image capturing in order, using the flowchart.

In this embodiment, the order and the IP address of each camera are registered by using the image capturing function of the camera in order to fix the order of cameras performing strobe emission and to register the order and the IP address corresponding to the order with each camera before simultaneous image capturing. In the following, the processing procedure of the order registration will be described.

As shown in FIG. 8, order plates 3 for image capturing are first placed in front of the camera which are arranged in proximity to each other. These are for applying orders to cameras, and may be plates with numbers written thereon or plates with different colors, for example. In this case, number plates with figures of "1", "2", "3" and "4" are respectively placed in front of camera A to camera D.

Subsequently, the user operates each camera to issue an order registration command to the operation section of each camera. On receiving the registration command, each operation section 10 performs the processing shown in the flowchart of FIG. 9. Hereinafter, the operation section and the execution section of an n-th camera (n denotes an integer from 1 to N, and denotes the total number of cameras performing simultaneous image capturing) are expressed as an operation section $10_n$ and an execution section $20_n$.

Figure 9:
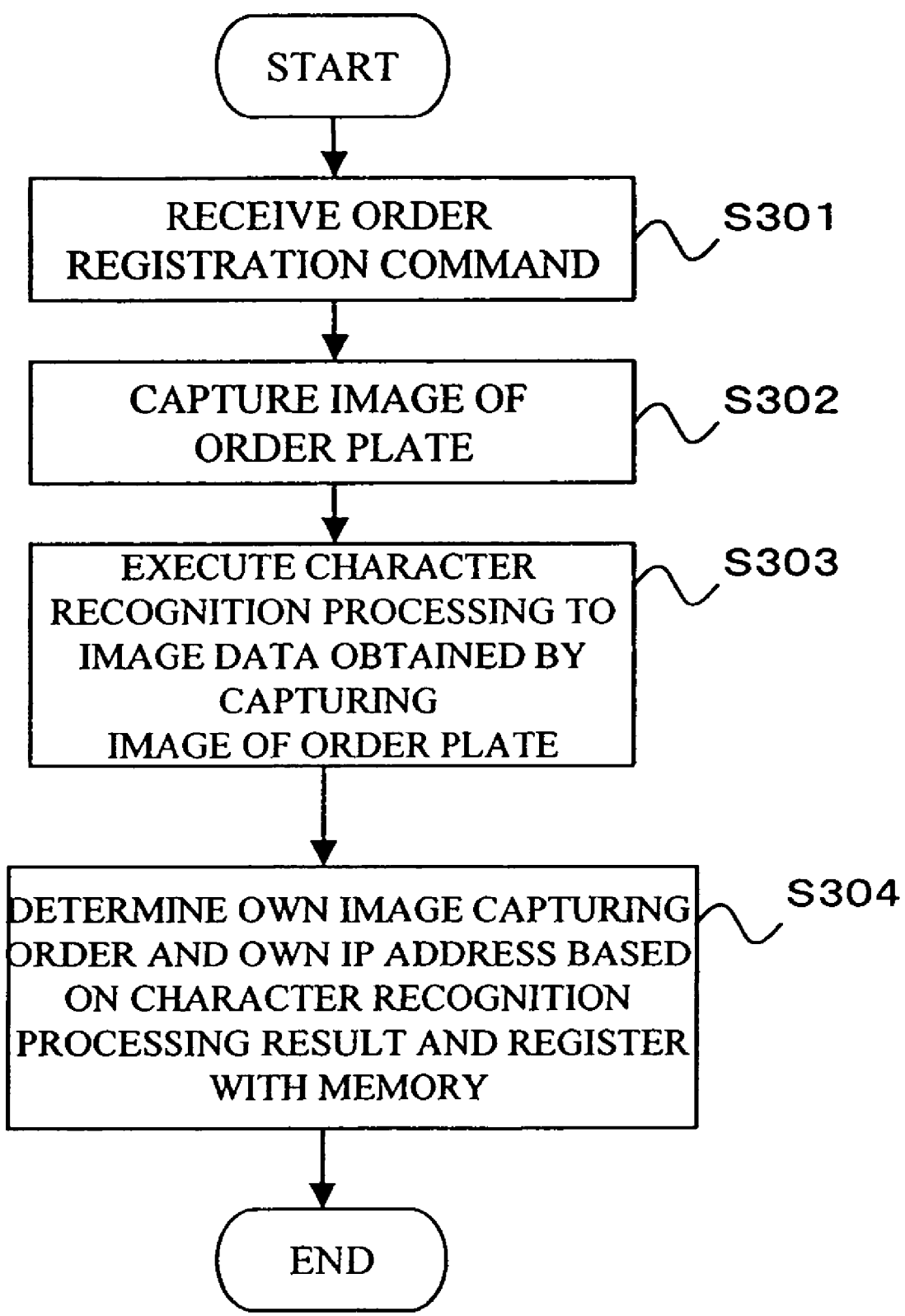
FIG. 9 is a flowchart showing a processing procedure when each camera registers an order and an IP address by utilizing the image capturing function of a camera, in the second embodiment.

In FIG. 9, the operation section $10_n$ receives the order registration command (S301), and causes its own execution section $20_n$ to execute image capture processing based on the command, and to capture the image of the order plate for image capturing (S302). Then, the operation section $10_n$ obtains image data, which has been obtained by capturing the image, from the execution section $20_n$, and executes character recognition processing on the image data (S303). Further, after specifying its own image capturing order and determining the IP address corresponding to the image capturing order based on the processing result, it registers them in a memory (S304). Note that a general character recognition technique such as OCR (Optical Character Recognition) may be used for the character recognition processing. For example, each order image data obtained by capturing the image of each order plate for image capturing is previously stored in association with the order (figure), similarity between the order image data and the image data obtained by capturing the image by themselves is calculated, and an order corresponding to order image data having the highest similarity is determined to be an image capturing order applied to its own camera.

Furthermore, the IP address corresponding to the image capturing order is determined as follows. The network section of the IP address is previously fixed. In the case of IPv4, the network section is fixed as the high 24 bit, for example, and "192.168.1.*" is fixed as the network section. Then, a figure corresponding to each image capturing order is allocated for a host section. Thus, in this case, the IP address "192.168.1.1" is registered to cause a camera with the image capturing order of "1" to capture the image of the order plate "1", and the IP address "192.168.1.4" is registered to cause a camera with the image capturing order of "4" to capture the image of the order plate "4".

Figure 10:
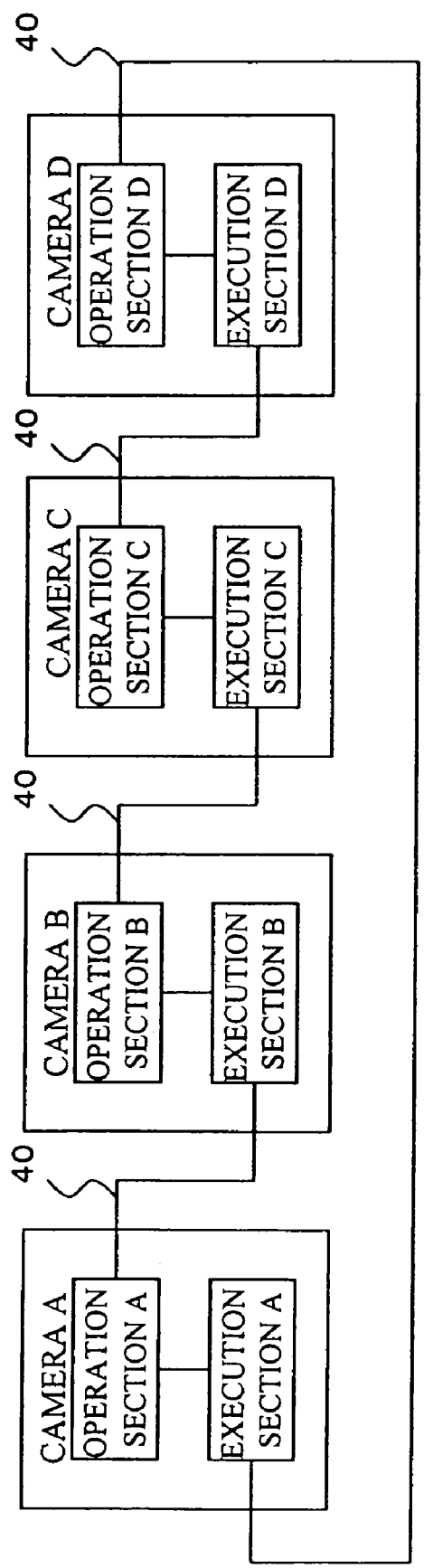
FIG. 10 is a view showing a connection mode of the operation section and the execution section of each camera, in the second embodiment.

When the image capturing order and the IP address are registered for each camera in this manner, the cameras are connected on a loop next as shown in FIG. 10. Specifically, the communication path 40 is established between the operation section, of a camera of the previous stage and the execution section$_{n+1}$ of a camera of the subsequent stage, and furthermore, the communication path 40 is established between the operation section$_N$ of a camera of the last stage and the execution section$_1$ of a camera of the foremost stage.

Figure 11:
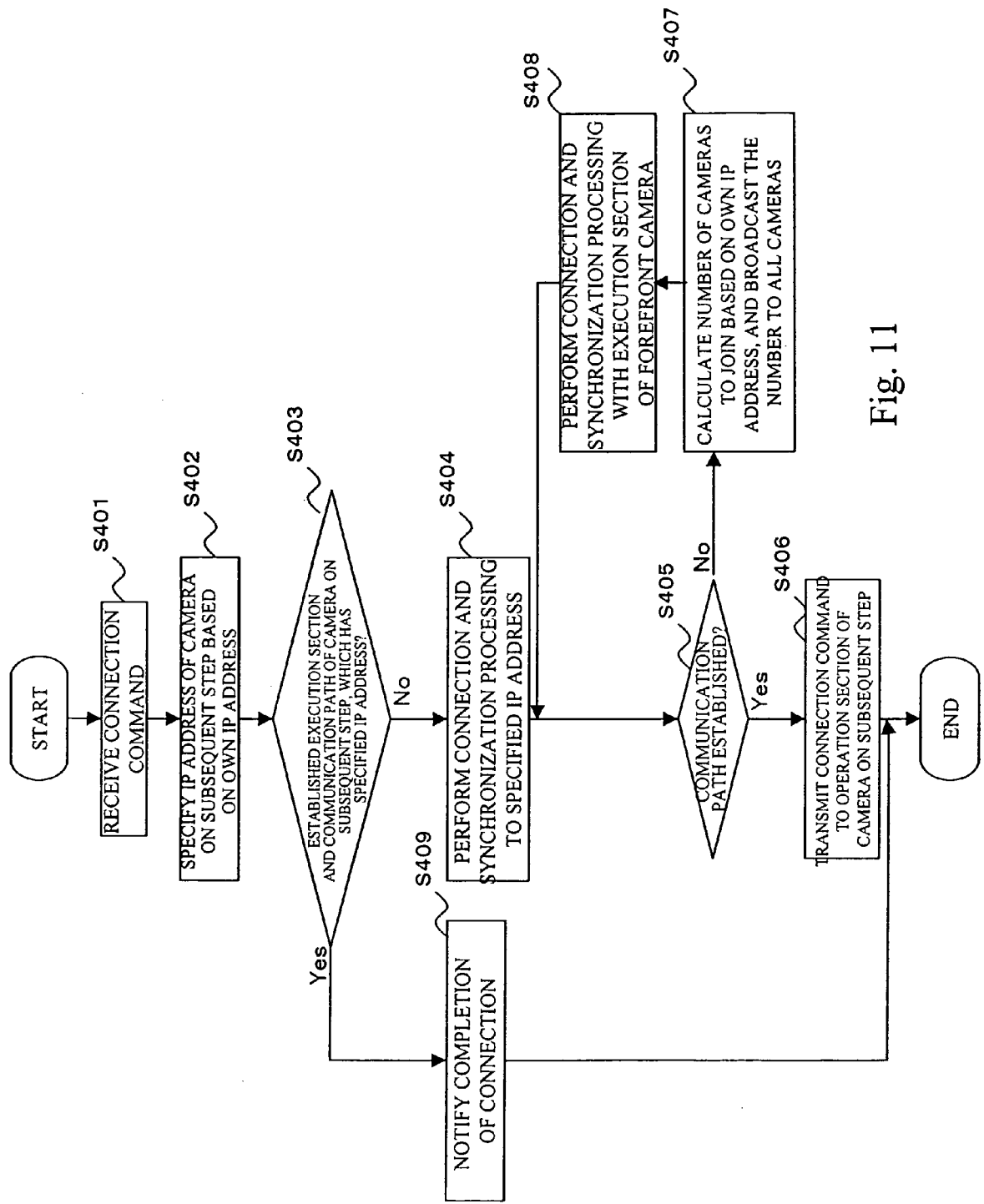
FIG. 11 is a flowchart showing a procedure in forming a loop network as shown in FIG. 10 between the operation section and the execution section of each camera, in the second embodiment.

Herein, description will be given for the establishing procedure for the communication path as shown in FIG. 10 by using the flowchart shown in FIG. 11.

The user operates any camera$_n$ to issue a connection instruction to the operation section $10_n$ of the camera. On receiving the connection instruction (S401), the operation section $10_n$ specifies the IP address of a camera$_{n+1}$ of the subsequent stage based on the IP address allocated for its own camera (S402). More specifically, the operation section $10_n$ specifies a value, which is obtained by increasing the value of the IP address registered with itself by 1, as the IP address of the camera$_{n-1}$ of the subsequent stage.

Then, the operation section $10_n$ judges whether or not the communication path is established to the execution section $20_{n+1}$ of the camera$_{n+1}$ of the subsequent stage, for which the specified IP address is allocated (S403). If the communication path is not established as a result of judgment, the operation section $10_n$ executes the establishment processing of the communication path, that is, the connection and synchronization processing shown in FIG. 7 to the execution section $20_{n+1}$ of the subsequent stage based on the specified IP address (S404). Next, the operation section $10_n$ judges whether or not the communication path could be established to the execution section $20_{n-1}$ of the subsequent stage as the result of the processing (S405). When the communication path has been successfully established as a result of judgment, the operation section further transmits the connection instruction to the operation section $10_{n+1}$ of the subsequent stage in order to establish the communication path to the execution section$_{n+2}$ of the further subsequent stage (S406).

On the other hand, when the communication path has not been established as a result of the judgment in S405, the operation section $10_n$ concludes that no camera exists on its subsequent stage, that is, its own camera is the camera of the last stage. Herein, since numbers starting from 1 are sequentially fixed to the cameras, the camera$_N$ of the last stage can grasp the total number of cameras contained in the loop network that has been established this time by grasping its own order from its own IP address. The information of the number of cameras is broadcast to each camera because it is used in performing the simultaneous image capture processing shown below (S407). The operation section of each camera, on receiving the information, stores the information of the number of cameras in the memory. After that, the operation section $10_N$ of the camera of the last stage establishes the communication path to the execution section $20_1$ of the camera of the foremost stage (S408).

Still further, when the operation section judges that the communication path has already been established to the execution section $20_{n+1}$ of the subsequent stage as a result of the judgment in S403, it concludes that the establishment of the loop network as shown in FIG. 10 has been completed, and the operation section $10_n$ performs notification of connection completion (S409). The notification of connection completion may be done by displaying the information on a display or the like, for example.

Meanwhile, in S406, the operation section $10_n$ transmits the connection instruction to the operation section $10_{n+1}$ of the subsequent stage after the communication path was established to the execution section $20_{n+1}$ of the subsequent stage. However, since the communication path is not established between the operation section $10_n$ and the operation section $10_{n+1}$ of the subsequent stage, the operation section $10_n$ cannot transmit the connection instruction directly to the operation section $10_{n+1}$ of the subsequent stage by unicast. Therefore, the operation section $10_n$ transmits the connection instruction to the operation section $10_{n+1}$ of the subsequent stage via the execution section $20_{n+1}$ of the subsequent stage to which the communication path was established. More specifically, the operation section $10_n$ transmits a PTP event, where the content of the connection instruction is shown on an argument, to the execution section $20_{n+1}$ of the subsequent stage. When the execution section $20_{n+1}$ receives the PTP event, it concludes that it is a PTP event that should be transferred to its own operation section $10_{n+1}$ based on the content shown in the argument of the PTP event, and transmits the PTP event to the operation section $10_{n+1}$. The operation section $10_{n+1}$ recognizes that it has received the connection instruction by referring to the argument of the PTP event, and executes the communication establishment processing to the execution section $20_{n+1}$ of the subsequent stage.

[Processing Procedure of the Operation Section of a Camera Performing Strobe Emission in Simultaneous Image Capturing]

Figure 12:
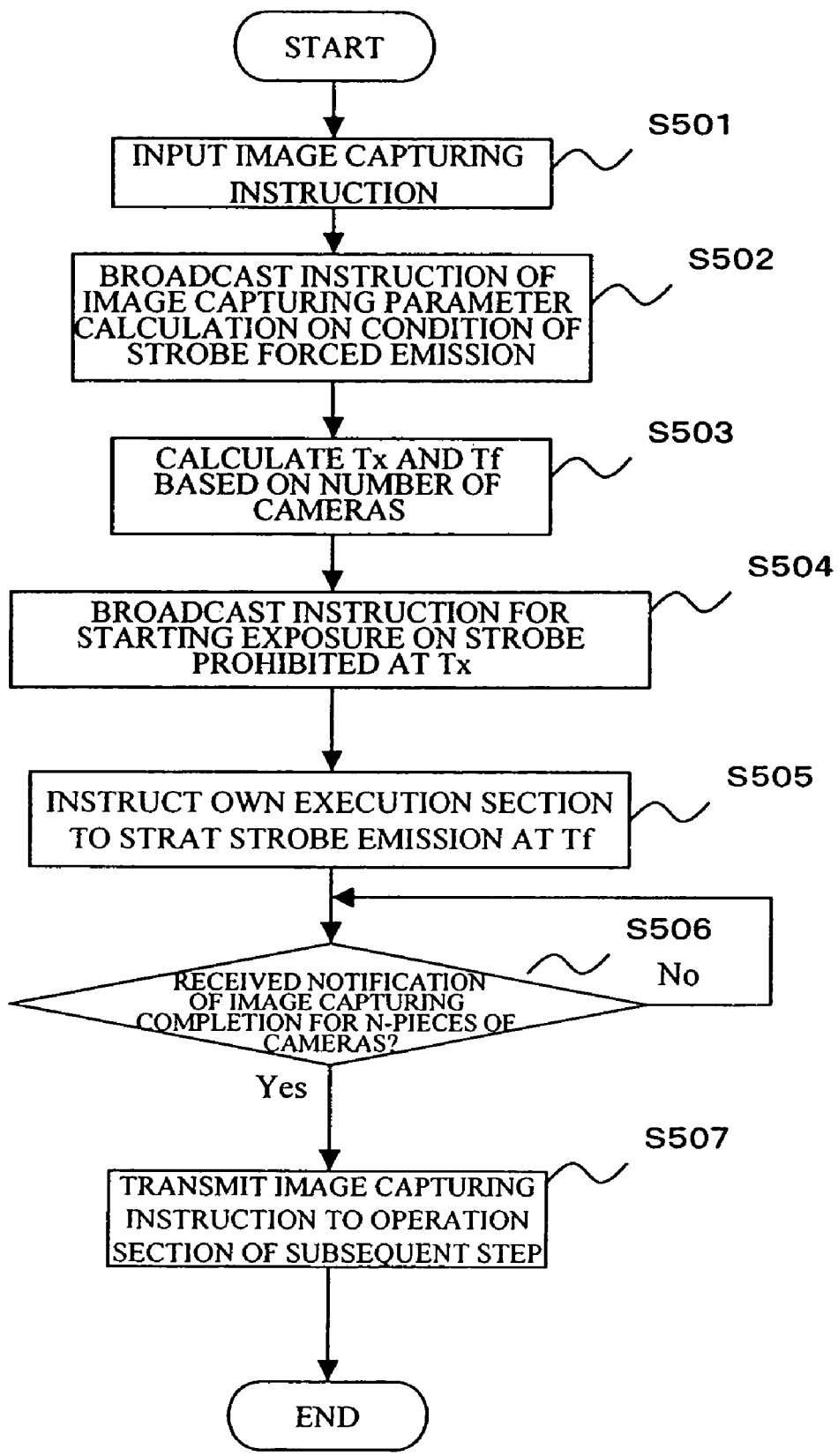
FIG. 12 is a flowchart showing a processing procedure of the operation section of a semiconductor constituting a camera, when performing simultaneous image capturing, in the second embodiment.

Subsequently, description will be given for the processing procedure of the operation section of a camera performing strobe emission in simultaneous image capturing using the flowchart shown in FIG. 12.

The operation section $10_n$ accepts the input of an image capturing instruction first (S501). Herein, in the case of the first camera, the image capturing instruction is input to the operation section when the user operates a UI, that is, by pressing the shutter button, for example. Further, in the case of the other cameras, the image capturing instruction is input to the operation section from the camera of the previous stage via the radio network.

In response to the image capturing instruction, the operation section $10_n$ broadcasts an instruction for performing calculation of an image capturing parameter on the condition of forced strobe emission (S502). Then, the operation section $10_n$ determines Tx showing the time to start exposure and Tf showing the time to start strobe emission (S503). In this case, regarding Tx and Tf to be determined, the operation section sets Tx and Tf such that the time difference Ie between Tx and Tf becomes larger than the synchronization error Ie that occurs between the cameras and the sum (Id+If+Ie) of the time difference Id, the strobe emission period If and the synchronization error Ie becomes smaller than the exposure period Ix, similar to the first embodiment. Note that the strobe emission period If is computed by the calculation of image capturing parameter in S502. Further, the synchronization error Ie may be fixed based on a value specified on the communication standard or the specifications, or the experimental value.

Furthermore, the operation section $10_n$ broadcasts an instruction for starting exposure with strobe prohibited at determined Tx (S504). Receiving the instruction, each execution section starts exposure at the timeTx by using the image capturing parameter calculated based on the instruction in S502. Subsequently, the operation section $10_n$ unicasts an instruction for starting strobe emission at Tf to its own execution section $20_n$ (S505), and the execution section $20_n$, on receiving the instruction, starts strobe emission at the time Tf by using the image capturing parameter calculated based on the instruction in S502.

After that, the operation section $10_n$ waits until it receives the notification of image capturing completion from all execution sections (S506). Note that the notification of image capturing completion is unicast from each execution section to the operation section $10_n$ at the point where a series of image capture processing is completed. The series of image capture processing means processing from a point where exposure ends and predetermined image processing is applied to obtained image capturing signals to a point where the signals are saved as image data in the memory.

When the operation section $10_n$ receives the notification of image capturing completion from all execution sections, it transmits the image capturing instruction to the operation section of the subsequent stage (S507).

As described, by executing the above-described processing, one camera performs strobe emission to perform image capturing and the other cameras simultaneously perform image capturing without strobe emission. In short, when the camera performing strobe emission is defined as a host camera, host cameras perform continuous image capturing while they are sequentially switched in a previously fixed order.

Figure 13:
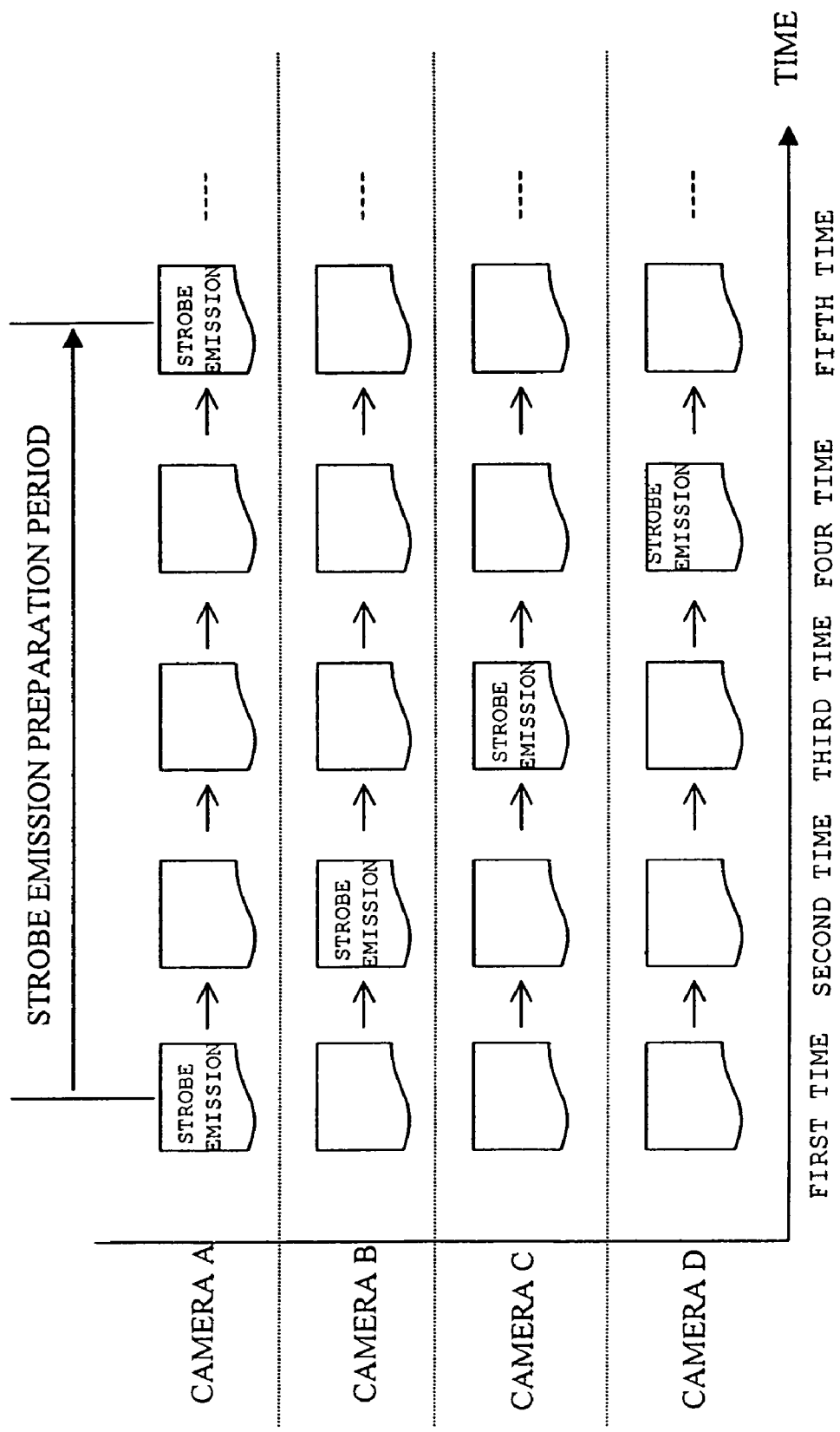
FIG. 13 is an image view showing a flow of image capturing by each camera in the second embodiment.

FIG. 13 is the image view showing the flow of image capturing of cameras A to D in this embodiment. As shown in the drawing, only one camera performs strobe emission in one image capture processing in this exposure, and image capturing is performed continuously while the host camera performing strobe emission is switched sequentially.

Note that continuous image capturing can be ended by turning off the power of any camera. Alternatively, the number of image capturing operations is previously fixed, the operation section of a camera that becomes the first host, that is, a camera operated by the user counts up the number of image capturing operations, and continuous image capturing may be ended by broadcasting an instruction of image capturing completion to each execution section at the point where the number reaches a predetermined number. Furthermore, image capturing time is previously fixed instead of the number of image capturing operation, and the instruction of image capturing completion may be broadcast to each execution section at the point where the predetermined time passes.

According to this embodiment, it is possible to prevent the subject from becoming too bright, which is caused by simultaneous strobe emission from multiple cameras. Further, by performing continuous image capturing while a camera performing strobe emission is sequentially switched, dependency on charging time during continuous image capturing can be reduced, and the number of images that can be captured within a predetermined period can be increased. In addition, by setting the time difference Id between the point at which to start exposure for image capturing Tx and the point at which to start strobe emission Tf larger than the previously assumed synchronization error Ie that occurs between cameras, and by setting Tx and Tf such that the sum (Id+If+Ie) of the time difference Id, the strobe emission period If and the synchronization error Ie becomes smaller than the exposure period Ix, strobe emission can be performed within the exposure period of each camera, and simultaneous image capturing using a strobe with a plurality of cameras can be appropriately performed.

What is claimed is:

1. A camera system where a camera for image capturing with built-in exposure control mechanism and a camera for providing strobe light with built-in strobe mechanism are synchronously connected via a radio network, wherein
said camera for image capturing comprises:
determining means for determining a point at which to start exposure for image capturing Tx and a point at which to start strobe emission Tf;
emission start command output means for outputting a strobe emission start command to start strobe emission at said point at which to start strobe emission Tf;
exposure start command output means for outputting an exposure start command to start exposure at said point at which to start exposure for image capturing Tx; and
exposure control means for controlling said exposure control mechanism so as to start exposure at said point at which to start exposure for image capturing Tx in response to said exposure start command,
said camera for providing strobe light comprises:
emission control means for controlling said strobe mechanism so as to start strobe emission at said point at which to start strobe emission Tf in response to said strobe emission start command that has been received via said radio network, and
said determining means determines the point at which to start exposure for image capturing Tx and the point at which to start strobe emission Tf such that said point at which to start exposure for image capturing Tx is earlier than said point at which to start strobe emission Tf, a time difference between said point at which to start exposure for image capturing Tx and said point at which to start strobe emission Tf becomes larger than the synchronization error between said camera for image capturing and said camera for providing strobe light, and strobe emission ends before completing exposure.

2. The camera system according to claim 1, wherein
said camera for image capturing comprises:
image capturing parameter calculation means for calculating exposure period and strobe emission period depending on image capturing scene, and
said determining means determines the point at which to start exposure for image capturing Tx and the point at which to start strobe emission Tf corresponding to an exposure period and a strobe emission period, which have been calculated.

3. A camera with a built-in exposure control mechanism, which is synchronously connected with a camera for providing a strobe light with a built-in strobe mechanism, said camera comprising:
determining means for determining a point at which to start exposure for image capturing Tx and a point at which to start strobe emission Tf;
emission start command output means for outputting a strobe emission start command to start strobe emission at said point at which to start strobe emission Tf to said camera for providing strobe light via said radio network;
exposure start command output means for outputting an exposure start command to start exposure at said point at which to start exposure for image capturing Tx; and
exposure control means for controlling said exposure control mechanism so as to start exposure at said point at which to start exposure for image capturing Tx in response to said exposure start command, and
said determining means determines the point at which to start exposure for image capturing Tx and the point at which to start strobe emission Tf such that said point at which to start exposure for image capturing Tx is earlier than said point at which to start strobe emission Tf, a time difference between said point at which to start exposure for image capturing Tx and said point at which to start strobe emission Tf becomes larger than the synchronization error between said camera for image capturing and said camera for providing strobe light, and strobe emission ends before completing exposure.

4. The camera according to claim 3, further comprising:
image capturing parameter calculation means for calculating an exposure period and a strobe emission period depending on image capturing scene, and
said determining means determines the point at which to start exposure for image capturing Tx and the point at which to start strobe emission Tf corresponding to the exposure period and the strobe emission period, which have been calculated.

5. A camera system where a plurality of cameras with built-in exposure control mechanism and strobe mechanism are synchronously connected via a radio network, one of said plurality of cameras becomes a host camera and the other cameras become sub-cameras, and said plurality of cameras perform simultaneous image capturing when the host camera controls each sub-camera, wherein
said each camera comprises:
means for determining a point at which to start exposure for image capturing Tx and a point at which to start strobe emission Tf, which is determining means for determining the point at which to start exposure for image capturing Tx and the point at which to start strobe emission Tf such that said point at which to start exposure for image capturing Tx is earlier than said point at which to start strobe emission Tf, the time difference between said point at which to start exposure for image capturing Tx and said point at which to start strobe emission Tf becomes larger than a synchronization error that occurs between the cameras, and strobe emission ends before completing exposure;
emission start command output means for outputting a strobe emission start command to start strobe emission at said point at which to start strobe emission Tf;
exposure start command output means for outputting an exposure start command to start exposure at said point at which to start exposure for image capturing Tx;
exposure control means for controlling said exposure control mechanism so as to start exposure at said point at which to start exposure for image capturing Tx in response to said exposure start command; and emission control means for controlling said strobe mechanism so as to start strobe emission at said point at which to start strobe emission Tf in response to said strobe emission start command, each camera, when it becomes said host camera, determines the point at which to start exposure for image capturing Tx and the point at which to start strobe emission Tf using said determining means, outputs the exposure start command to said each sub-camera using said exposure command output means, controls said exposure control mechanism so as to start exposure at said point at which to start exposure for image capturing Tx using said exposure control means, and controls said strobe mechanism so as to start strobe emission at said point at which to start strobe emission Tf using said emission control means, and each camera, when it becomes said sub-camera, controls said exposure control mechanism so as to start exposure at said point at which to start exposure for image capturing Tx by said exposure control means in response to said exposure start command received from said host camera via said radio network.

6. The camera system according to claim 5, wherein each camera comprises:

image capturing parameter calculation means for calculating exposure period and strobe emission period depending on image capturing scene, and said determining means determines the point at which to start exposure for image capturing Tx and the point at which to start strobe emission Tf corresponding to an exposure period and a strobe emission period, which have been calculated.

7. The camera system according to claim 5, wherein an order to become said host camera is previously fixed for said each camera, and a camera to be the host camera is switched according to the order at each simultaneous image capturing.

8. The camera system according to claim 7, wherein each camera comprises:

order registration means for capturing a different image for previously designated cameras, determining an order to become said host camera based on image data obtained from an image capturing result, and registering the order with itself.

9. The camera system according to claim 8, wherein said each camera comprises:

identification number registration means for determining an intrinsic identification number in said radio network based on the order determined, and registering the identification number with itself.

10. A camera with a built-in exposure control mechanism and strobe mechanism, which is synchronously connected with other cameras via a radio network and performs simultaneous image capturing in coordination with the other cameras, said camera comprising:

simultaneous image capturing start input means for accepting the input of a simultaneous image capturing start instruction;

means for determining a point at which to start exposure for image capturing Tx and a point at which to start strobe emission Tf in response to said simultaneous image capturing start instruction, which is determining means for determining the point at which to start exposure for image capturing Tx and the point at which to start strobe emission Tf such that said point at which to start exposure for image capturing Tx is earlier than said point at which to start strobe emission Tf, the time difference between said point at which to start exposure for image capturing Tx and said point at which to start strobe emission Tf becomes larger than a synchronization error that occurs between the camera and said other cameras, and strobe emission ends before completing exposure;

emission start command output means for outputting a strobe emission start command to start strobe emission at said point at which to start strobe emission Tf;

exposure start command output means for outputting an exposure start command to start exposure at said point at which to start exposure for image capturing Tx;

exposure control means for controlling said exposure control mechanism so as to start exposure at said point at which to start exposure for image capturing Tx in response to said exposure start command; and emission control means for controlling said strobe mechanism so as to start strobe emission at said point at which to start strobe emission Tf in response to said strobe emission start command, and said exposure start instruction output means also outputs said exposure start instruction to exposure control means of said other cameras.

11. The camera according to claim 10, comprising:

image capturing parameter calculation means for calculating exposure period and strobe emission period depending on image capturing scene, wherein said determining means determines the point at which to start exposure for image capturing Tx and the point at which to start strobe emission Tf corresponding to an exposure period and a strobe emission period, which have been calculated.

12. The camera according to claim 10, said camera comprising:

image capturing completion notification receiving means for receiving notification of image capturing completion based on an exposure start instruction from said other cameras that became output destinations of said exposure start instruction; and image capturing instruction output means for outputting a simultaneous image capturing start instruction to any one of said other cameras after detecting that all of said other cameras, which became the output destinations of said exposure start instruction, have received said image capturing completion notification.

13. The camera according to claim 12, wherein an order is previously registered with said camera in a relationship with said other cameras, and said image capturing instruction output means outputs the simultaneous image capturing start instruction to a camera that is registered as next in order to said camera.

14. The camera system according to claim 13, wherein said camera comprises:

order registration means for capturing a different image for previously designated cameras, determining an order with itself based on image data obtained from image capturing result, and registering the order with itself.

15. The camera according to claim 14, comprising:

identification number registration means for determining an intrinsic identification number in said radio network based on the order determined, and registering the identification number with itself.

* * * * *